US011124133B2

(12) United States Patent
Dellock et al.

(10) Patent No.: US 11,124,133 B2
(45) Date of Patent: Sep. 21, 2021

(54) IRIDESCENT BADGES FOR VEHICLES

(71) Applicant: Ford Global Technologies, LLC, Dearborn, MI (US)

(72) Inventors: Paul Kenneth Dellock, Northville, MI (US); Stuart C. Salter, White Lake, MI (US); Talat Karmo, Waterford, MI (US); Michael Musleh, Canton, MI (US); Chester Stanislaus Walawender, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/597,962

(22) Filed: Oct. 10, 2019

(65) Prior Publication Data

US 2020/0039451 A1   Feb. 6, 2020

Related U.S. Application Data

(63) Continuation of application No. 15/132,732, filed on Apr. 19, 2016, now abandoned.

(51) Int. Cl.
*B60R 13/00* (2006.01)
*G09F 19/12* (2006.01)
(Continued)

(52) U.S. Cl.
CPC .......... *B60R 13/005* (2013.01); *B29C 45/372* (2013.01); *G09F 3/02* (2013.01);
(Continued)

(58) Field of Classification Search
CPC ....... B60R 13/005; G09F 19/12; G09F 21/04; G09F 3/02; G09F 2007/1882;
(Continued)

(56) References Cited

U.S. PATENT DOCUMENTS 2,063,207 A   12/1936   Taylor
2,890,627 A    6/1959   Onksen
(Continued)

FOREIGN PATENT DOCUMENTS

CN      86100290 A    9/1987
CN       1854203 A   11/2006
(Continued)

OTHER PUBLICATIONS

First Office Action in Chinese Patent Application No. 2017102573891, dated Aug. 4, 2020, 15 pages.
(Continued)

*Primary Examiner* — Nancy R Johnson
(74) *Attorney, Agent, or Firm* — David Coppiellie; Price Heneveld LLP (57) ABSTRACT

An iridescent vehicle badge (and methods for making it) that includes a translucent, polymeric badge having a non-planar shape and comprising an interior and an exterior surface. Further, at least one of the surfaces of the badge comprises a plurality of diffraction gratings that are integral with the badge, each having a thickness from 250 nm to 1000 nm and a varying period from 50 nm to 5 microns. In some cases, the thickness can range from 500 nm to 750 nm. The period, in some cases, can vary within a set of discrete values in one or more portions of the at least one of the surfaces of the badge, e.g., from 150 nm to 400 nm.

20 Claims, 4 Drawing Sheets

(51) Int. Cl.
  *G09F 21/04* (2006.01)
  *G09F 3/02* (2006.01)
  *B29C 45/37* (2006.01)
  *G09F 7/18* (2006.01)
  *B29C 45/26* (2006.01)
  *B29L 31/00* (2006.01)
  *B29C 33/38* (2006.01)
  *B29C 33/40* (2006.01)
  *B29C 33/42* (2006.01)
  *B29D 11/00* (2006.01)

(52) U.S. Cl.
  CPC .............. *G09F 19/12* (2013.01); *G09F 21/04* (2013.01); *B29C 33/3842* (2013.01); *B29C 33/40* (2013.01); *B29C 33/424* (2013.01); *B29C 45/263* (2013.01); *B29D 11/00769* (2013.01); *B29L 2031/744* (2013.01); *G09F 2007/1882* (2013.01)

(58) Field of Classification Search
  CPC . B29C 45/372; B29C 45/263; B29C 33/3842; B29C 33/40; B29C 33/424; B29L 2031/744; G02B 5/1857; G02B 27/44; A44C 1/00; A44C 1/001; A44C 1/002; A44C 17/001; A47G 33/08
  USPC .......................................................... 428/11
  See application file for complete search history.

(56) References Cited

U.S. PATENT DOCUMENTS

| | | |
|---|---|---|
| 4,261,031 A | 4/1981 | Fratty |
| 4,816,968 A | 5/1989 | Yamada |
| 4,920,460 A | 4/1990 | Mori |
| 5,034,867 A | 7/1991 | Mayer |
| 5,612,102 A | 3/1997 | Nakama |
| 5,703,667 A | 12/1997 | Ochiai |
| 5,709,453 A | 1/1998 | Krent |
| 5,779,341 A | 7/1998 | Chinniah |
| 5,871,834 A | 2/1999 | Wang |
| 6,068,890 A | 5/2000 | Kaumle |
| 6,285,472 B1 | 9/2001 | Odhner |
| 6,372,341 B1 | 4/2002 | Jung |
| D462,032 S | 8/2002 | Schmauz-Grimsei |
| 6,525,111 B1 | 2/2003 | Spencer |
| 7,068,434 B2 | 6/2006 | Florczak |
| 7,976,931 B2 | 7/2011 | Schilling |
| 7,998,383 B2 | 8/2011 | Lee |
| 8,033,136 B2 | 10/2011 | Maltezos |
| 8,314,989 B1 | 11/2012 | Mossberg |
| 8,619,363 B1 | 12/2013 | Coleman |
| 8,651,720 B2 | 2/2014 | Sherman |
| 8,834,004 B2 | 9/2014 | Thompson |
| 9,062,386 B2 | 6/2015 | Reeder |
| 2001/0040810 A1 | 11/2001 | Kusagaya |
| 2002/0054434 A1 | 5/2002 | Florczak |
| 2002/0080622 A1 | 6/2002 | Pashley |
| 2006/0061153 A1 | 3/2006 | Hamamoto |
| 2006/0158888 A1 | 7/2006 | Wang |
| 2009/0050454 A1 | 2/2009 | Matsukawa |
| 2010/0202154 A1 | 8/2010 | Hamkens |
| 2011/0037243 A1 | 2/2011 | Laframboise |
| 2012/0024010 A1 | 2/2012 | Maltezos |
| 2015/0079375 A1 | 3/2015 | Yang |
| 2015/0371570 A1 | 12/2015 | Sciackitano |
| 2016/0107371 A1 | 4/2016 | Hurme |
| 2016/0231493 A1 | 8/2016 | Iordache |
| 2017/0080784 A1 | 3/2017 | Kobayashi |

FOREIGN PATENT DOCUMENTS

| | | |
|---|---|---|
| CN | 103692979 A | 4/2014 |
| CN | 203698421 U | 7/2014 |
| CN | 107305262 A | 10/2017 |
| EP | 0870655 | 10/1998 |
| JP | H0572593 U | 10/1993 |
| JP | 2004284178 A | 10/2004 |
| JP | 2006023567 A | 1/2006 |
| JP | 2010214798 A | 9/2010 |
| JP | 2013154670 A | 8/2013 |
| KR | 101209331 | 11/2012 |
| WO | 9704339 | 2/1997 |

OTHER PUBLICATIONS

China National Intellectional Property Administration, First Office Action in Chinese Patent Application No. 201710936887.9, dated Dec. 14, 2020, 11 pages.

IRIDESCENT BADGES FOR VEHICLES

CROSS REFERENCE TO RELATED APPLICATIONS

This application is a continuation application that claims priority to and the benefit under 35 U.S.C. § 120 of U.S. patent application Ser. No. 15/132,732, filed on Apr. 19, 2016, entitled "IRIDESCENT BADGES FOR VEHICLES AND METHODS OF MAKING THE SAME," the entire disclosure of which is incorporated by reference herein.

FIELD OF THE INVENTION

The present invention generally relates to iridescent badges, trim and other exterior surfaces for vehicles and methods of making the same, particularly automotive badges with a jewel-like appearance.

BACKGROUND OF THE INVENTION

Car enthusiasts and owners of luxury and high-end vehicles are continually demanding new aesthetics that justify, at least in part, the high cost of such vehicles. Vehicle badges can be designed to reflect the luxury and high-end nature of particular vehicle models. For example, certain vehicle models can be more desirable to car enthusiasts and owners with a badge having a jewel-like appearance.

The direct incorporation of jewels and/or precious metals into a vehicle badge can satisfy these needs in some respects. These elements might be encapsulated within a translucent badge for a luxurious aesthetic. Nevertheless, merely adding jewels and precious metals to conventional badges will significantly increase the cost of the badge, and all but the most cost-insensitive car enthusiasts will likely object to the significant added cost of these materials. In addition, the inclusion of jewels and/or precious metals into a vehicular badge increases the likelihood that it will be removed by thieves as a target of relative opportunity.

Other approaches to upgrading the aesthetics of vehicle badges have focused on mimicking the look of diamonds and jewels within a molded plastic part. For example, it is feasible to make faceted, plastic badges that attempt to approximate the look of actual diamonds and jewels. Unfortunately, the results of such approaches are not promising. Generally, such badges appear to look like costume jewelry and, arguably, could detract from the overall aesthetic of a luxury vehicle rather than enhance it.

Accordingly, there is a need for vehicular badges, trim and other exterior surfaces (and methods of making them) that exhibit an iridescent or jewel-like appearance without a significant cost increase associated with the enhancement. In addition, these iridescent, vehicular badges should maintain their appearance over a vehicle lifetime while being exposed to a typical vehicular environment.

SUMMARY OF THE INVENTION

According to one aspect of the present invention, an iridescent vehicle badge is provided that includes a translucent, polymeric badge having a non-planar shape and comprising an interior and an exterior surface. Further, at least one of the surfaces of the badge is non-planar and comprises a diffraction grating integral with the badge, the grating having a thickness from 250 nm to 1000 nm and a period from 50 nm to 5 microns.

According to another aspect of the present invention, an iridescent vehicle badge is provided that includes a translucent, polymeric badge having a non-planar shape and comprising an interior and an exterior surface. Further, at least one of the surfaces of the badge comprises a plurality of diffraction gratings that are integral with the badge, each having a thickness from 250 nm to 1000 nm and a varying period from 50 nm to 5 microns.

According to a further aspect of the present invention, a method of making an iridescent vehicle badge is provided that includes the steps: forming a mold with mold surfaces corresponding to interior and exterior surfaces of the badge; ablating at least one of the mold surfaces to form a diffraction grating mold surface; and forming the badge with a diffraction grating having a thickness from 250 nm to 1000 nm and a period from 50 nm to 5 microns in the mold surfaces with a polymeric material.

According to a further aspect of the present invention, an iridescent vehicular badge for ambient lighting is provided that includes: a translucent, polymeric vehicular badge having a non-planar shape and an interior and an exterior surface; and a non-specular, light-scattering backing layer applied to the interior surface of the badge and configured for attachment to a vehicle. Each of the interior surface and the exterior surface is faceted and comprises a plurality of diffraction gratings integral with the badge. Each grating has a thickness from 500 nm to 750 nm and a period from 150 nm to 400 nm.

According to another aspect of the present invention, an iridescent vehicular badge for ambient lighting is provided that includes: a translucent, polymeric vehicular badge having a non-planar shape and an interior and an exterior surface; and a non-specular, light-scattering backing layer applied to the interior surface of the badge and configured for attachment to a vehicle. Each of the interior surface and the exterior surface is curved and comprises a plurality of diffraction gratings integral with the badge. Each grating has a thickness from 500 nm to 750 nm and a period from 150 nm to 400 nm.

Another aspect of the present invention includes an iridescent vehicular badge for ambient lighting is provided that includes: a translucent, polymeric vehicular badge having a non-planar shape and an interior and an exterior surface; and a non-specular, light-scattering backing layer applied to the interior surface of the badge and configured for attachment to a vehicle. Each of the interior surface and the exterior surface is faceted and comprises a plurality of diffraction gratings integral with the badge. Each grating has a thickness from 500 nm to 750 nm and a period from 150 nm to 400 nm. The badge further comprises glass fillers in the range of 1% to 15% by volume and an arch-like cross-sectional shape.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
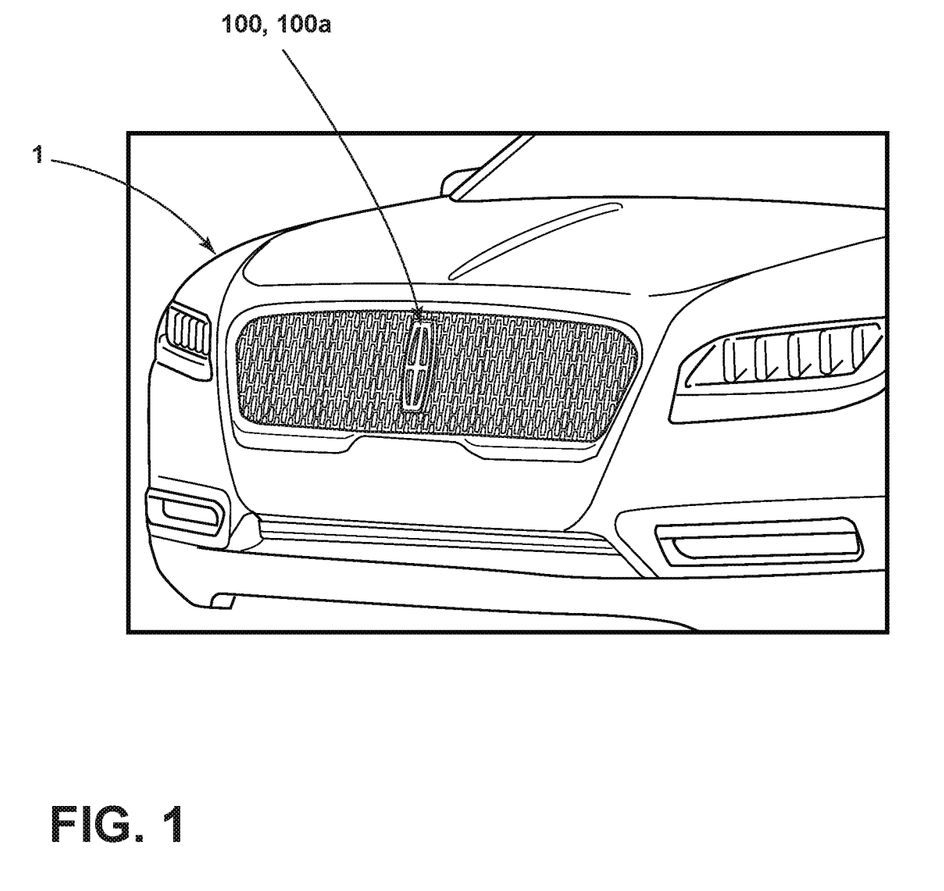
FIG. 1 is a front perspective view of an iridescent vehicular badge affixed to the front of a vehicle according to an aspect of the disclosure.

For purposes of description herein, the terms "upper," "lower," "right," "left," "rear," "front," "vertical," "horizontal," "interior," "exterior," "vehicle forward," "vehicle rearward," and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Described in this disclosure are iridescent badges, trim and other exterior surfaces (collectively, "iridescent vehicular elements") for vehicles (and methods of making the same). The iridescent vehicular elements contain one or more diffraction gratings that are integral with the primary component(s) of the elements (e.g., a badge member), each of which provides sparkle and iridescence to the element. Various microscopic features can be added or adjusted within the gratings to achieve varied aesthetic effects. Gratings can also be incorporated into various regions within the vehicular element to achieve other varied, aesthetic effects. Further, these iridescent badges, trim and other iridescent vehicular elements can be injection molded as one part, and typically cost only marginally more than conventional badges and trim.

Referring to FIG. 1, a front perspective view of an iridescent vehicular badge 100, 100a affixed to the front of a vehicle 1 is provided according to an aspect of the disclosure. As depicted, the badge 100, 100a is characterized by an iridescent or jewel-like appearance under ambient lighting (e.g., from the sun). One or more diffraction gratings 20 (see FIGS. 2 and 3) configured within an exterior and/or interior surface of the badge 100, 100a provide the iridescent or jewel-like appearance.

Figure 2:
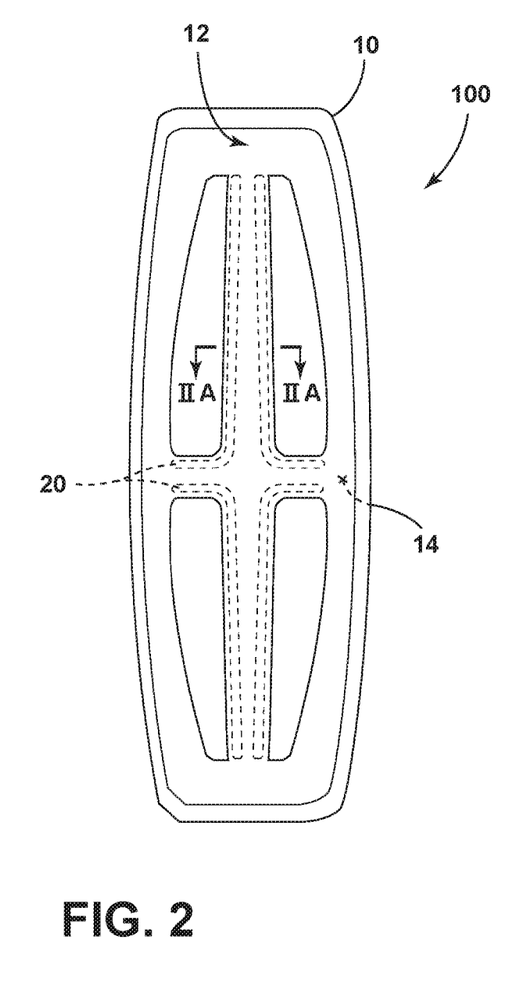
FIG. 2 is a top-down, schematic plan view of an iridescent vehicular badge according to an aspect of the disclosure.

As shown in FIG. 2, an iridescent vehicular badge 100 can include a translucent, polymeric badge member 10. The badge member 10 includes one or more exterior surfaces 12 and one or more interior surfaces 14. In some aspects, the badge member 10 is characterized by an optical transmissivity of 85% or more over the visible spectrum (e.g., 390 to 700 nm). Preferably, the badge member 10 is characterized by an optical transmissivity of 90% or more, and even more preferably, 95% or more, over the visible spectrum. Further, the badge member 10 can be optically clear with no substantial coloration. In other embodiments, the badge member 10 can be tinted or affixed with one or more filters on its exterior surfaces 12 and/or interior surfaces 14 to obtain a desired hue (e.g., blue, red, green, etc.).

Referring again to FIG. 2, badge member 10 of the iridescent vehicular badge 100 is fabricated from a polymeric material. These polymeric materials include thermoplastic and thermosetting polymeric materials, e.g., silicones, acrylics and polycarbonates. Preferably, the precursor material(s) employed to fabricate the badge member 10 have a high flow rate and/or a low viscosity during a molding process such as injection molding. In certain aspects, fillers (not shown), e.g., glass beads and particles, can be added to a polymeric material, serving as a matrix, to form the badge member 10 without significant detriment to the optical properties of the member. These fillers can provide added durability and/or additional aesthetic effects to the iridescent vehicular badge 100. Preferably, glass fillers are added in the range of 1 to 15% by volume, depending on the nature of the filler and the desired effect (e.g., enhanced durability, added light scattering, etc.).

Figure 2A:
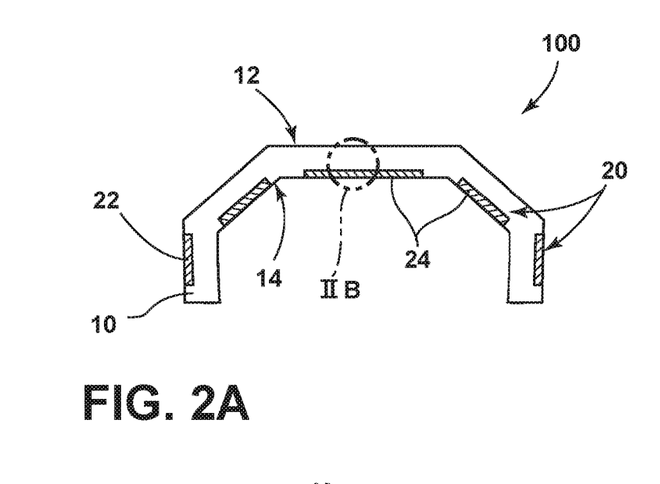
FIG. 2A is a cross-sectional, schematic view of the badge depicted in FIG. 2 through line IIA-IIA.

The badge member 10 of the iridescent vehicular badge 100 can take on any of a variety of shapes, depending on the nature of the badge, vehicle insignia and other design considerations. For example, in some embodiments, one or more of the exterior and interior surfaces 12, 14 of the badge member 10 are planar (e.g., faceted), non-planar, curved or characterized by other shapes. As also understood by those with ordinary skill in the field, the exterior and interior surfaces 12, 14 can be characterized with portions having planar features and portions having non-planar features. As shown in FIGS. 2 and 2A, for example, the badge member 10 has planar (e.g., faceted) exterior and interior surfaces 12, 14 comprising diffraction gratings 20 as viewed in cross-section, while having some curved portions in forming the overall design of the vehicular badge 100.

Still referring to FIG. 2, the badge member 10 of the iridescent vehicular badge 100 can consist of a single component in a preferred embodiment. For example, the badge member 10 can be formed as a single piece with integral diffraction grating(s) 20 from a single mold. In other aspects, the member 10 can be formed from multiple parts, preferably with the parts joined, without significant detriment to the overall optical properties of the member 10.

Referring now to FIG. 2A, exterior and interior surfaces 12, 14 of the badge member 10 of the iridescent vehicular badge 100 include one or more diffraction gratings 20, preferably integral with the badge member 10. As depicted in exemplary fashion in FIG. 2A, the iridescent vehicular badge 100 includes a badge member 10 with exterior and interior surface diffraction gratings 22, 24 on planar portions of exterior and interior surfaces 12, 14, respectively. Some aspects of the vehicular badge 100 include a badge member 10 with one or more diffraction gratings 20 in the form of exterior surface gratings 22 on one or more planar portions of the exterior surface 12. Other aspects of the vehicular badge 100 include a badge member 10 with one or more diffraction gratings 20 in the form of interior surface gratings 24 on one or more planar portions of the interior surface 14.

Figure 2B:
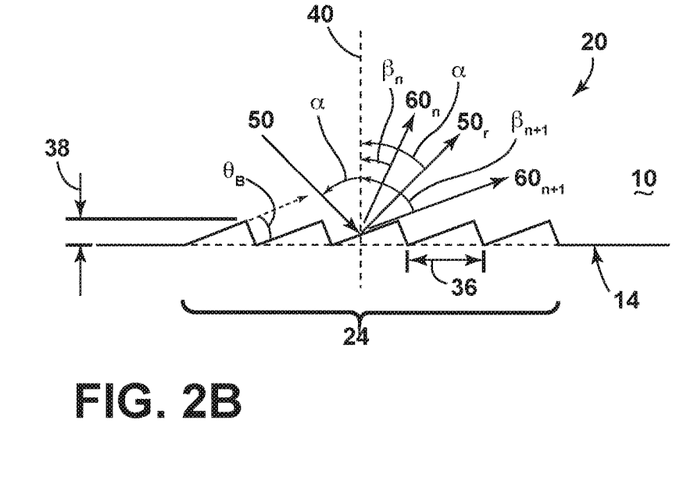
FIG. 2B is an enlarged, cross-sectional schematic view of a diffraction grating incorporated into an interior surface of the badge depicted in FIG. 2.

As shown schematically in FIG. 2B in cross-sectional form, the diffraction gratings 20 of the badge member 10 of an iridescent vehicular badge 100 are formed at a microscopic level. In an embodiment, the diffraction gratings 20 (i.e., as inclusive of exterior and interior surface diffraction gratings 22, 24) have a thickness 38 that ranges from 250 nm to 1000 nm. The thickness 38 of the diffraction gratings 20, for example, should be maintained in the range of 250 to 1000 nm to ensure that the iridescent vehicular badge 100 (see FIGS. 2 and 2A) exhibits a jewel-like appearance through light diffraction upon illumination in direct ambient lighting while also having a minimal effect on the optical clarity of the badge 100 under non-direct ambient lighting. Preferably, the thickness 38 of the diffraction gratings 20 ranges from about 390 nm to 700 nm. In other embodiments, the thickness 38 of the diffraction gratings 20 ranges from 500 nm to 750 nm.

As also shown schematically in FIG. 2B, the grooves of the diffraction gratings 20 within the badge member 10 of an iridescent vehicular badge 100 can be configured in various shapes to diffract incident light and produce an iridescent and jewel-like appearance. As depicted in FIG. 2B in exemplary form, the gratings 20 have a sawtooth or triangular shape. In three dimensions, these gratings 20 can appear with a stepped or sawtooth shape without angular features (i.e., in the direction normal to what is depicted in FIG. 2B), pyramidal in shape, or some combination of stepped and pyramidal shapes. Other shapes of the diffraction gratings 20 include hill-shaped features (not shown)—e.g., stepped features with one or more curved features. The diffraction gratings 20 can also include portions with a combination of triangular and hill-shaped features. More generally, the shapes of the gratings 20 should be such that an effective blazing angle $\theta_B$ of at least 15 degrees is present for one or more portions of each grating, tooth or groove of the diffraction gratings 20. The blaze angle $\theta_B$ is the angle between step normal (i.e., the direction normal to each step or tooth of the grating 20) and the direction normal 40 to the exterior and interior surfaces 12, 14 having the grating 20.

Generally, the blaze angle $\theta_B$ is optimized to maximize the efficiency of the wavelength(s) of the incident light, typically ambient sunlight, to ensure that maximum optical power is concentrated in one or more diffraction orders while minimizing residual power in other orders (e.g., the zeroth order indicative of the ambient light itself). An advantage of situating exterior and interior surface diffraction gratings 22, 24 (see FIG. 2A) on planar portions or aspects of the exterior and interior surfaces 12, 14 (e.g., as shown in exemplary form in FIG. 2A for a diffraction grating 24 on a planar portion of an interior surface 14) is that a constant blaze angle $\theta_B$ and period 36 will result in consistent reflected and diffracted light produced from the diffraction grating. Such consistency can be employed by a designer of the iridescent vehicular badge 100 (see FIG. 2) to ensure that particular jewel-like effects are observable by individuals at different locations and distances from the badge 100.

As also shown schematically in FIG. 2B, the diffraction gratings 20 of the badge member 10 of an iridescent vehicular badge 100 are characterized by one or more periods 36 (also known as d in the standard nomenclature of diffraction gratings). In most aspects of the vehicular badge 100 (see FIG. 2), the period 36 of the diffraction grating 20 is maintained between about 50 nm and about 5 microns. In general, the maximum wavelength that a given diffraction grating 20 can diffract is equal to twice the period 36. Hence, a diffraction grating 20 with a period 36 that is maintained between about 50 nm and about 5 microns can diffract light in an optical range of 100 nm to about 10 microns. In a preferred embodiment, the period 36 of a diffraction grating 20 is maintained from about 150 nm to about 400 nm, ensuring that the grating 20 can efficiently diffract light in an optical range of about 300 nm to about 800 nm, roughly covering the visible spectrum.

Referring again to FIG. 2B, an interior surface diffraction grating 24 along a portion of an interior surface 14 of a badge member 10 is depicted in exemplary form. Incident light 50 (typically ambient, sun light) at an incident angle α is directed against a sawtooth-shaped diffraction grating 24 having a thickness 38, a period 36 and a blaze angle $\theta_B$. More particularly, a portion of the incident light 50 (preferably, a small portion) striking the grating 24 at an incident angle α is reflected as reflected light $50_r$ at the same angle α, and the remaining portion of the incident light 50 is diffracted at particular wavelengths corresponding to diffracted light $60_n$, $60_{n+1}$, etc. at corresponding diffraction angles $\beta_n$, $\beta_{n+1}$, etc. The reflected light $50_r$ is indicative of the zeroth order (i.e., n=0) and the diffracted light $60_n$, $60_{n+1}$, $60_{n+2}$ are indicative of the nth order diffraction according to standard diffraction grating terminology, where n is an integer corresponding to particular wavelengths of the reflected or diffracted light.

Interior surface gratings 24, such as depicted in an enlarged, schematic format in FIG. 2B, are advantageous within the iridescent vehicular badge 100 (see FIGS. 2 and 2A) due to their protected location. In particular, these gratings 24 are generally protected from damage, alteration and/or wear due to their location on the backside of the badge member 10. Given that incident light 50 must pass through the member 10 to reach the grating 24 and that diffracted light $60_n$, $60_{n+1}$, etc., must also pass through the member 10 to produce an iridescent effect, the diffraction efficiency of gratings 24 can be somewhat lower than the diffraction efficiency of the exterior surface gratings 22 (see FIG. 2A) due to light absorption within the member 10. On the other hand, exterior surface gratings 22, as configured within the exterior surface 12 of the member 10 are more susceptible to damage, alteration and/or wear than interior surface gratings 24. Accordingly, a preferred embodiment of the vehicular badge 100 includes both exterior and interior surface diffraction gratings 22, 24 to balance diffraction efficiency and wear resistance.

Figure 3:
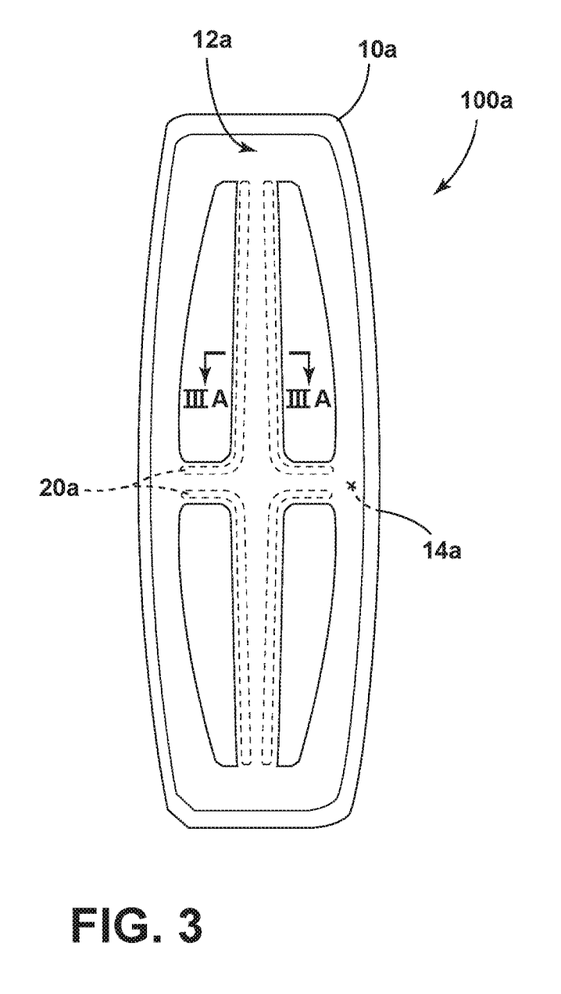
FIG. 3 is a top-down, schematic plan view of an iridescent vehicular badge with non-planar exterior and interior surfaces according to an aspect of the disclosure.
Figure 3A:
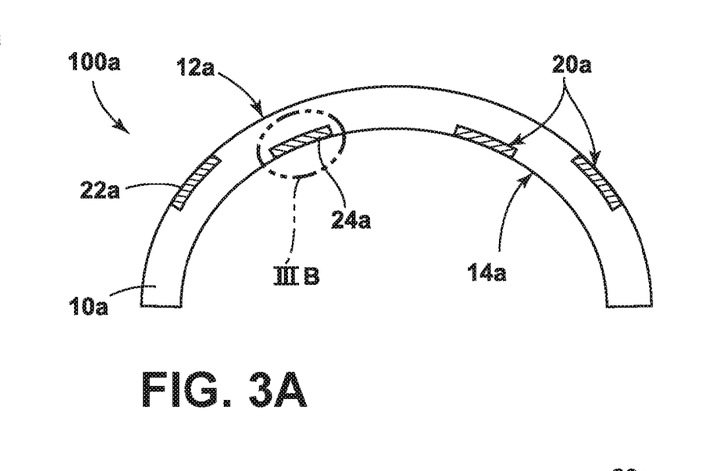
FIG. 3A is a cross-sectional, schematic view of the badge depicted in FIG. 3 through line IIIA-IIIA.
Figure 3B:
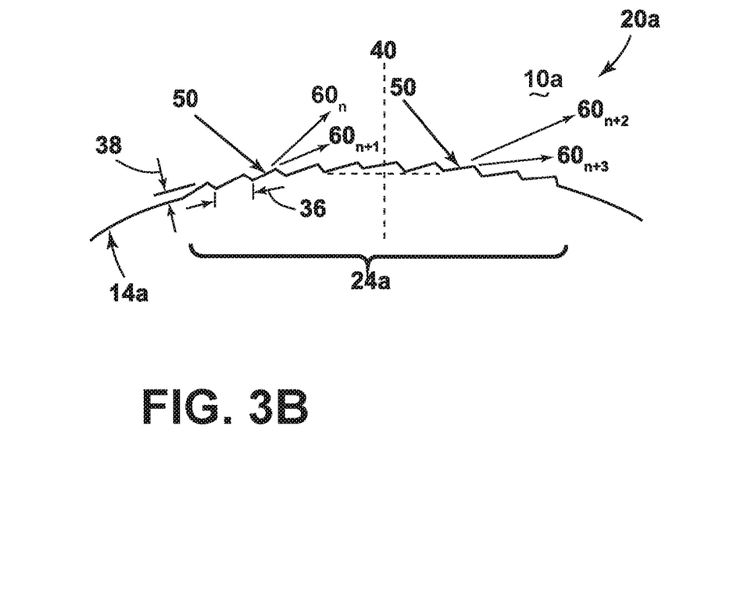
FIG. 3B is an enlarged, cross-sectional schematic view of a diffraction grating incorporated into a non-planar interior surface of the badge depicted in FIG. 3.

Referring to FIGS. 3-3B, an iridescent vehicular badge 100a comprising a translucent, polymeric badge member 10a with non-planar exterior and interior surfaces 12a, 14a is depicted according to an aspect of the disclosure. The iridescent vehicular badge 100a shown in FIGS. 3 and 3A is similar to the iridescent vehicular badge 100 depicted in FIGS. 2 and 2A, and like-numbered elements have the same structure and function. The primary difference between badges 100a and badges 100 is that the former have a badge member 10a with non-planar portions of interior and exterior surfaces 12a, 14a (or such surfaces 12a, 14a that are substantially non-planar across their entire surface area) and diffraction gratings 20a on such non-planar features. In contrast, vehicular badges 100 have a badge member 10 with diffraction gratings 20 located on planar portions of exterior and interior surfaces 12, 14. By situating the diffraction gratings 20a on non-planar portions of the interior and exterior surfaces 12a, 14a, certain jewel-like and iridescent effects can be obtained with badges 100a that differ from those obtained with badges 100. In all other respects, however, the iridescent vehicular badges 100 and 100a have the same structures and functions.

Referring to FIG. 3A, the iridescent vehicular badge 100a includes a badge member 10a with one or more diffraction gratings 20a. Further, diffraction gratings 20a include exterior and interior surface diffraction gratings 22a and 24a, respectively, located within or otherwise on non-planar portions of exterior and interior surfaces 12a, 14a of the member 10a. Some aspects of the vehicular badge 100a include a badge member 10a with one or more diffraction gratings 20a in the form of exterior surface gratings 22a on one or more non-planar portions of the exterior surface 12a.

Other aspects of the vehicular badge 100a include a badge member 10a with one or more diffraction gratings 20a in the form of interior surface gratings 24a on one or more non-planar portions of the interior surface 14a.

Referring now to FIG. 3B, the cross-sectional view of the diffraction gratings 20a within the badge member 10a of an iridescent vehicular badge 100a are similar to the diffraction gratings 20 in FIG. 2B. Incident light 50 (typically ambient, sun light) at an incident angle at (see FIG. 2B) is directed against a sawtooth-shaped diffraction grating 24a having a thickness 38, a period 36 and a blaze angle $\theta_B$ (see FIG. 2B). More particularly, a portion of the incident light 50 (preferably, a small portion) striking the grating 24a at an incident angle $\alpha$ is reflected as reflected light $50_r$ at the same angle $\alpha$ (see FIG. 2B), and the remaining portion of the incident light 50 is diffracted at particular wavelengths corresponding to diffracted light $60_n$, $60_{n+1}$, etc., at corresponding diffraction angles $\beta_n$ and ($\beta_{n+1}$ (see FIG. 2B) and so on. The reflected light $50_r$ is indicative of the zeroth order (i.e., n=0) and the diffracted light $60_n$, $60_{n+1}$, etc., are indicative of the nth order diffraction according to standard diffraction grating terminology, where n is an integer corresponding to particular wavelengths of the reflected or diffracted light. Given that the interior surface 14a is non-planar in the badge 10a depicted in FIG. 3B, however, the incident light 50 strikes each tooth at a slightly different angle, even when the blaze angle $\theta_B$ (not shown in FIG. 3B) and period 36 is held constant. The result is that each tooth of the diffraction grating 20a can produce diffracted light at unique or differing diffraction orders. For example, as shown in FIG. 3B, one tooth of the diffraction grating can produce diffracted light $60_n$ and $60_{n+1}$ and a different tooth can produce diffracted light $60_{n+2}$ and $60_{n+3}$, all from the same incident light 50. Consequently, the interior surface diffraction grating 24a, and more generally diffraction gratings 20a, advantageously can produce jewel-like effects of widely varying wavelengths within small regions of the badge 100a (see FIGS. 3 and 3A).

Figure 4:
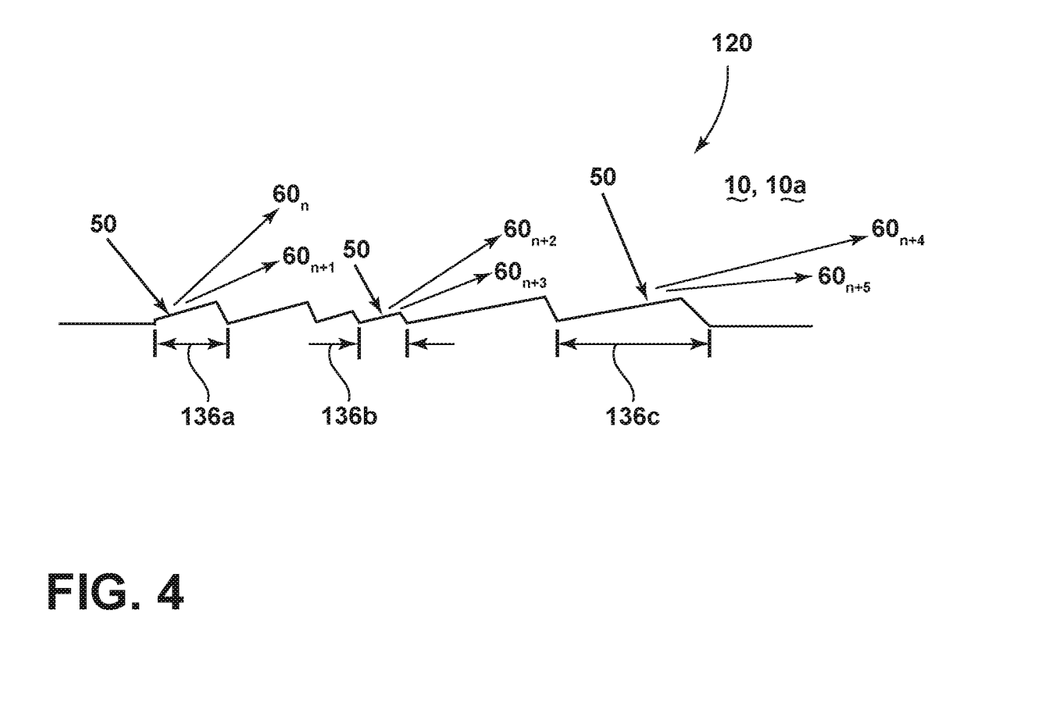
FIG. 4 is an enlarged, cross-sectional schematic view of a diffraction grating with a varying period.

Referring now to FIG. 4, a diffraction grating 120 with varying periods (e.g., as including a set of periods), that can be employed in iridescent vehicular badges 100, 100a (or other badges consistent with the principles of the disclosure) is depicted in a cross-sectional form according to an aspect of the disclosure. The diffraction grating 120 is similar in most respects to the diffraction gratings 20, 20a depicted in FIGS. 2-2B and 3-3B, with like-numbered elements having the same structure and function. Diffraction grating 120 differs from diffraction gratings 20, 20a in that it contains varying periods within the same grating. In particular, diffraction grating 120 can have two or more sets of teeth or grooves, each having a particular period (e.g., period 136a) that can produce light at unique or differing diffraction orders. As shown in exemplary form in FIG. 4, the grating 120 is configured with three periods—period 136a, period 136b and period 136c. One set of teeth of the diffraction grating 120 with a period of 136a can produce diffracted light $60_n$ and $60_{n+1}$, a different set of teeth with a period of 136b can produce diffracted light $60_{n+2}$ and $60_{n+3}$, and a third set of teeth with a period of 136c can produce diffracted light $60_{n+4}$ and $60_{n+5}$, all from the same incident light 50. Consequently, a diffraction grating 120, whether employed on interior and/or exterior surfaces 12, 12a, 14, 14a (see FIGS. 2A and 3A) of the member 10, 10a, (see FIGS. 2A and 3A) advantageously can produce jewel-like effects of widely varying wavelengths within various regions of the badge 100, 100a (see FIGS. 2A and 3A) containing such a grating.

In some aspects, the diffraction grating 120 includes a varying period that varies between two to ten discrete values or, more preferably, between two to five discrete values. According to another aspect, a diffraction grating 120 with varying periods can be employed in one or more portions of an exterior and/or interior surface 12, 12a, 14, 14a of a badge member 10, 10a, and one or more diffraction gratings 20, 20a having a constant period are employed in other portions of the exterior and/or interior surface of the badge member 10, 10a to create interesting, jewel-like appearance effects produced by the vehicular badge 100, 100a employing the gratings. In another embodiment, the diffraction grating 120 includes a varying period that changes between any number of values, only limited by the overall length of the grating 120 and/or the processing capabilities to develop such variability through precise control of mold dimensions.

Turning back toward iridescent vehicular badges 100, 100a more generally, optional coatings (not shown) may be applied over the exterior surfaces 12, 12a of the badge member 10, 10a. For example, an optically clear sealing layer (e.g., a polyurethane seal) can be applied over such exterior surfaces to add further mechanical and/or ultraviolet light protection to the badges 100, 100a, particularly to any diffraction gratings 20, 20a included in the exterior surfaces of these badges. Advantageously, the additional of a relatively thin protective coating can protect the diffraction gratings while retaining the benefits of locating the grating on the exterior surface of the badge in terms of diffraction efficiency and the overall iridescence obtained by the badges 100, 100a.

In another aspect of the iridescent vehicular badges 100, 100a, an optional backing plate or backing layer can be applied to the interior surfaces 14, 14a of the badge members 10, 10a of these badges. Such a backing plate or layer can be specular (e.g., mirror-like) or non-specular (e.g., light-scattering), depending on the aesthetic effect desired of the badge 100, 100a. Similarly, the backing plate or layer can be white, grey, black or any conceivable color. For example, a badge designer could employ a red backing plate to produce a red-hued iridescence with a badge 100, 100a configured on the hood of a blue-colored vehicle possessing such a badge.

According to another aspect of the disclosure, a method of making an iridescent vehicle badge (e.g., iridescent vehicular badges 100, 100a) is provided that includes a step of forming a mold with mold surfaces corresponding to interior and exterior surfaces of the badge (e.g., exterior and interior surfaces 12, 12a, 14, 14a). Preferably, a mold is formed for this step from metals or metal alloys sufficient to withstand the temperatures and environmental conditions associated with injection molding a badge member (e.g., members 10, 10a) suitable for the iridescent vehicular badge. In a preferred embodiment, the forming a mold step is conducted such that the mold is capable of injection molding a single piece badge member 10, 10a.

The method of making an iridescent vehicular badge also includes a step of ablating at least one of the mold surfaces to form one or more diffraction grating mold surfaces. For example, the ablating step is conducted to form one or more such diffraction grating surfaces intended to correspond to diffraction gratings (e.g., gratings 20, 20a and 120) intended to be incorporated in portions of the exterior and/or interior surfaces of the badge (e.g., badges 100, 100a). In a preferred embodiment, the ablating step is conducted with a laser ablation process. Laser ablation processes, e.g., employing an AgieCharmilles Laser P cutting apparatus from Georg Fischer Ltd., are particularly adept at developing the diffraction grating mold surfaces in the mold given their ability to precisely ablate microscopic features into metal and metal alloy mold surfaces.

Referring again to the method of making the iridescent vehicular badge, it also includes a step of forming the badge (e.g., badges 100, 100*a*) with a diffraction grating (e.g., diffraction gratings 20, 20*a*, 120) having a thickness from 250 nm to 1000 nm and a period from 50 nm to 5 microns in the mold surfaces with a polymeric material (e.g., optically clear silicone with a high flow rate). Preferably, the forming the badge step is conducted with an injection molding process. In a preferred aspect, portions of the mold in proximity to the one or more diffraction grating mold surfaces are heated prior to the step of forming the badge. Adding additional heat to these portions of the mold serves to further reduce the viscosity of the polymeric material such that it can flow within the very small scale aspects of the diffraction grating mold surfaces.

According to other aspects of the disclosure, the concepts of the foregoing iridescent vehicular badges 100, 100*a* can be applied to other iridescent vehicular elements. These elements include exterior and interior vehicle trim, license plate holders, hubcaps, key bezels and any other feature that might benefit from iridescent appearance effects under ambient lighting, for example. It is also feasible to employ molds for the creation of such iridescent vehicular elements that can produce one-of-a-kind or near one-of-a-kind jewel-like appearance effects. For example, an iridescent vehicular badge 100, 100*a* can be designed for a mold with a fully-symmetric badge member having one or more symmetrically positioned diffraction grating(s) that diffract light differently in each direction. Once a given badge has been created, the random orientation associated with a manual or robot-driven installation on a vehicle can create a one-of-a-kind or near one-of-a-kind jewel-like appearance.

In a further aspect, iridescent vehicular badges 100, 100*a* can be configured with diffraction gratings 20, 20*a* such that they produce an iridescent appearance under day-time, ambient illumination while balancing the reduction of sparkle and glare for oncoming drivers under day-time or night-time conditions. Notably, diffraction gratings 20, 20*a* can be placed within certain locations of the exterior and/or interior surfaces 12, 12*a*, 14, 14*a* to produce the desired jewel-like appearance, but only when observers are located in positions not typical of oncoming vehicles.

Variations and modifications can be made to the aforementioned structure without departing from the concepts of the present invention. Such variations and modifications, and other embodiments understood by those with skill in the field within the scope of the disclosure, are intended to be covered by the following claims unless these claims by their language expressly state otherwise.

What is claimed is:

1. An iridescent vehicular badge for ambient lighting, comprising:
    a translucent, polymeric vehicular badge having a non-planar shape and comprising an interior and an exterior surface; and
    a non-specular, light-scattering backing layer applied to the interior surface of the badge,
    wherein each of the interior surface and the exterior surface is faceted and comprises a plurality of diffraction gratings integral with the badge,
    wherein each grating has a thickness from 500 nm to 750 nm and a period from 150 nm to 400 nm, and
    further wherein the badge comprises an arch-like cross-sectional shape.

2. The badge according to claim 1, wherein the badge has a silicone composition.

3. The badge according to claim 1, wherein each diffraction grating comprises grooves having a triangular- or hillock-shaped cross-section.

4. The badge according to claim 1, wherein the period of each diffraction grating varies within one or both of the interior surface and the exterior surface of the badge.

5. The badge according to claim 1, wherein the period of each diffraction grating varies between two to five discrete values within one or both of the interior surface and the exterior surface of the badge.

6. The badge according to claim 4, wherein the period of the diffraction grating varies within a set of discrete values within one or more portions of one or both of the interior surface and the exterior surface of the badge.

7. A vehicular hood assembly, comprising:
    the badge according to claim 1; and
    a vehicle hood,
    wherein the backing layer of the badge is affixed to the vehicle hood.

8. An iridescent vehicular badge for ambient lighting, comprising:
    a translucent, polymeric vehicular badge having a non-planar shape and comprising an interior and an exterior surface; and
    a non-specular, light-scattering backing layer applied to the interior surface of the badge,
    wherein each of the interior surface and the exterior surface is curved and comprises a plurality of diffraction gratings integral with the badge,
    wherein each grating has a thickness from 500 nm to 750 nm and a period from 150 nm to 400 nm, and
    wherein the badge comprises an arch-like cross-sectional shape.

9. The badge according to claim 8, wherein the badge has a silicone composition.

10. The badge according to claim 8, wherein each diffraction grating comprises grooves having a triangular- or hillock-shaped cross-section.

11. The badge according to claim 8, wherein the period of each diffraction grating varies within one or both of the interior surface and the exterior surface of the badge.

12. The badge according to claim 8, wherein the period of each diffraction grating varies between two to five discrete values within one or both of the interior surface and the exterior surface of the badge.

13. The badge according to claim 11, wherein the period of the diffraction grating varies within a set of discrete values within one or more portions of one or both of the interior surface and the exterior surface of the badge.

14. A vehicular hood assembly, comprising:
    the badge according to claim 8; and
    a vehicle hood,
    wherein the backing layer of the badge is affixed to the vehicle hood.

15. An iridescent vehicular badge for ambient lighting, comprising:
    a translucent, polymeric vehicular badge having a non-planar shape and comprising an interior and an exterior surface; and
    a non-specular, light-scattering backing layer applied to the interior surface of the badge,
    wherein each of the interior surface and the exterior surface is faceted and comprises a plurality of diffraction gratings integral with the badge, wherein each grating has a thickness from 500 nm to 750 nm and a period from 150 nm to 400 nm, wherein the badge further comprises glass fillers in the range of 1% to 15% by volume, and further wherein the badge comprises an arch-like cross-sectional shape.

16. The badge according to claim 15, wherein the badge has a silicone composition.

17. The badge according to claim 15, wherein each diffraction grating comprises grooves having a triangular- or hillock-shaped cross-section.

18. The badge according to claim 15, wherein the period of each diffraction grating varies within one or both of the interior surface and the exterior surface of the badge.

19. The badge according to claim 15, wherein the period of each diffraction grating varies between two to five discrete values within one or both of the interior surface and the exterior surface of the badge.

20. The badge according to claim 18, wherein the period of the diffraction grating varies within a set of discrete values within one or more portions of one or both of the interior surface and the exterior surface of the badge.

* * * * *